United States Patent [19]

Buckholz et al.

[11] Patent Number: 5,069,916
[45] Date of Patent: Dec. 3, 1991

[54] PROCESS FOR MICROWAVE BROWNING, COMPOSITION USED FOR SAME AND PRODUCT PRODUCED THEREBY

[75] Inventors: Lawrence L. Buckholz, Middletown; Marion A. Sudol, Boonton; Brian Byrne, East Brunswick, all of N.J.

[73] Assignee: International Flavors & Fragrances Inc., New York, N.Y.

[21] Appl. No.: 700,778

[22] Filed: May 16, 1991

Related U.S. Application Data

[60] Continuation-in-part of Ser. No. 596,498, Oct. 12, 1990, which is a division of Ser. No. 535,529, Jun. 8, 1990, Pat. No. 4,985,261, which is a continuation-in-part of Ser. No. 440,794, Nov. 24, 1989, Pat. No. 4,943,697, which is a division of Ser. No. 356,503, May 25, 1989, Pat. No. 4,904,490, which is a continuation-in-part of Ser. No. 295,450, Jan. 10, 1989, Pat. No. 4,882,184.

[51] Int. Cl.$^5$ ............................ A23L 1/00; A21D 6/00
[52] U.S. Cl. .................................... 426/243; 426/262; 426/305; 426/549
[58] Field of Search ............... 426/243, 262, 265, 305, 426/496, 549

[56] References Cited

U.S. PATENT DOCUMENTS

| | | | |
|---|---|---|---|
| 407,356 | 9/1886 | Tan et al. ............................ | 426/107 |
| 4,518,618 | 5/1985 | Hsia et al. .......................... | 426/262 |
| 4,735,812 | 8/1988 | Bryson et al. ...................... | 426/262 |
| 4,857,340 | 8/1989 | Parliment et al. ................... | 426/107 |
| 4,882,184 | 11/1989 | Buckholz et al. .................. | 426/243 |
| 4,968,522 | 11/1990 | Steinke et al. ..................... | 426/262 |

*Primary Examiner*—George Yeung
*Attorney, Agent, or Firm*—Arthur L. Liberman

[57] ABSTRACT

Described is a process for carrying out microwave browning on baked goods and products produced thereby. The process comprises the step of providing:

(a) a composition of matter consisting essentially of procedures of a Maillard reaction product flavor, a solvent capable of raising the dielectric constant of the surface of a foodstuff to be cooked whereby the cooking time will be less than 6 minutes (such as water or a mixture of propylene glycol and water or a mixture of glycerine and water or a mixture of propylene glycol and glycerine or propylene glycol or glycerine taken alone;

(b) providing an uncooked baked goods foodstuff, e.g. dough;

(c) coating the composition of (a) onto the surface of the uncooked foodstuff; and (d) exposing the uncooked coated foodstuff with microwave radiation for a period of under 360 seconds whereby the resulting product is caused to be edible as a cooked foodstuff.

4 Claims, No Drawings

PROCESS FOR MICROWAVE BROWNING, COMPOSITION USED FOR SAME AND PRODUCT PRODUCED THEREBY

This application is a continuation-in-part of application for U.S. Letters Patent, U.S. Ser. No. 596,498 filed on Oct. 12, 1990 which is a divisional of application for U.S. Letters Patent, U.S. Ser. No. 535,524 filed on June 8, 1990, now U.S. Pat. No. 4,985,261 issued on Jan. 15, 1991, which is a continuation-in-part of application for U.S. Letters Patent, U.S. Ser. No. 440,794 filed on Nov. 24, 1989, now U.S. Pat. No. 4,943,697 issued on July 24, 1990 which is a divisional of application for U.S. Letters Patent, U.S. Ser. No. 356,503 filed on May 25, 1989, now U.S. Pat. No. 4,904,490 issued on Feb. 27, 1990, which is a continuation-in-part of application for U.S. Letters Patent, U.S. Ser. No. 295,450 filed on Jan. 10, 1989, now U.S. Pat. No. 4,882,184 issued on Nov. 21, 1989.

BACKGROUND OF THE INVENTION

The increased use of microwaves for cooking has given rise to a large market in microwavable foods. While the advantage of microwave cooking over convection oven cooking is the time savings, the disadvantage is that baked goods and meats do not develop the surface browning or crust formation expected with convection oven cooking.

Our objective has been to create that browning which enhances the products appearance, making it look as if it were cooked in a convection oven.

In the microwave, food does not have sufficient time or temperature for the chemicals responsible for browning to react. Therefore, for a microwave browning system to work, it must accelerate the rate of the browning reactions or locally increase the surface temperature. Ultimately, the reactions responsible for browning have to be accomplished in the relatively short time frame dictated by the foods preparation conditions. The times needed for preparing microwave foods vary depending upon the power output of the microwave unit and the mass of the food to be cooked. A typical 750 watt microwave will cook baked goods in 40 seconds to 4 minutes, while meat will take 6 to 15 minutes.

Several additional requirements for a successful microwave browning system are as follows:
1. in addition to the desired browning effect, it must generate either no aroma or one which is compatible with the target food;
2. the browning reaction must not take place before cooking the food; and
3. after cooking, the browning must stop, and not darken substantially.

The reactions responsible for browning during convection oven cooking are the caramelization of sugars and the Maillard reaction between naturally occurring reducing sugars, amino acids, amines, peptides and proteins which results in the formation of colored melanoidins. Until recently (1984) there were numerous patent and literature references to such reactions for the production of flavors, where the generation of color was inconsequential or objectionable. In the past few years several patents have appeared wherein microwave browning created by Maillard reactions have been the topic.

Although the prior art does take advantage of the reaction between reducing sugars and amino acids, it has not made any correlation of reaction rates needed for browning reactions with reaction variables such as pH, solvent, or sugar reactivity and in addition, it does not take into account certain requirements of the nature of the sugar or sugar mixtures to be used, e.g., a mixture containing 30–60% fructose in addition to other sugars.

THE INVENTION

Our invention has shown that the order of sugar reactivities observed for the typical thermally induced Amadori and Maillard reactions holds true in microwave cooking and has a particular advantage when using a sugar composition containing from 30–60% fructose. As expected, pentoses are more reactive than hexoses and 6-deoxyhexoses are more reactive than hexoses.

There is a strong relationship between pH and reactivity. At pH's in the range of 9–13, the browning reaction is accelerated relative to acid pH's. Such a rate enhancement is attributed to the removal of a proton from the amino acid, leaving the amino group unprotonated and, therefore, more nucleophilic. The consequence of the latter is to accelerate nucleophilic substitution of the amino group on the carbonyl of the reducing sugar. Since this reaction is the first step in the formation of color, it can be concluded that this is the rate determining step to melanoidins. In food applications, the pH is adjusted to a range of 9–13 by the addition of sodium bicarbonate, although any base would achieve the same effect.

Another unexpected finding is that the solvent in which the Maillard browning reaction is run dramatically affects the rate of browning. Aprotic solvents, such as triacetin and vegetable oil, are useless in browning reaction systems since the reactants are not soluble in the solvent. Polar protic solvents are amongst the solvents in which the reactants are soluble; however, not all members of this solvent class are useful for microwave browning. Ethanol is an unacceptable solvent since the rate of the browning reaction in this solvent is on the order of hours. Using water, propylene glycol and glycerine the rate of browning is rapid in our system, achieving the desired coloration in 40 seconds to 6 minutes (360 seconds).

The mechanism of solvent action is believed to be twofold. First, the ability of the solvent to solubilize the reactants (including fructose) is essential; however, that in itself is insufficient to qualify a solvent without the second property. The successful solvent has the ability to absorb microwave radiation (2450 MHz) and retain this absorbed energy as heat. Solvents with high heat capacities, high viscosities and low thermal conductivities are desirable, as they facilitate heat retention. With the above properties, the solvent effectively focuses part of the microwave radiation on the food's surface, locally raising the temperature and accelerating the browning reaction. Propylene glycol and glycerine are two materials which meet the necessary requirements as microwave browning solvents in our system when desired to run the microwave reaction at times less than 3 minutes. Water is a material which meets the necessary requirement as a microwave browning solvent for our system when running the microwave reaction at 6 minutes or less.

The Maillard reaction product useful in the system of this invention is as follows:

(a) from about 10 up to about 20% proline;
(b) from about 2 up to about 5% ribose;
(c) from about 30 up to about 60% fructose; from about 40 up to about 60% solvent.

The solvent compositions may be as follows:
(i) water;
(ii) propylene glycol;
(iii) glycerine;
(iv) mixtures of water with glycerine;
(v) mixtures of water with propylene glycol; and
(vi) mixtures of propylene glycol with glycerine.

When using mixtures of solvents the ratios of water:-propylene glycol may vary from about 1:99 up to about 99:1. When using mixtures of water and propylene glycol the ratio of water:propylene glycol may vary from 1:99 up to 99:1. When using mixtures of propylene glycol and glycerine the ratio of propylene glycol:glycerine may vary from 1:99 up to about 99:1.

Thus, the solvents useful in the carrying out of our invention have dielectric constants which cause the cooking via microwave radiation to take place under 360 seconds (in the range of from about 40 seconds up to about 360 seconds).

The principles given above are illustrated in the following examples.

EXAMPLE I

Into 100 ml beakers were placed exactly 40.4 g of solvent. Each beaker was irradiated with 245 OMHz microwave radiation for 20 seconds, afterwhich the solvents temperature was measured. Experiments were run in triplicate. The results for several solvents are set forth in the following Table I.

TABLE I

| SOLVENT | TEMPERATURE (C.) |
|---|---|
| Propylene glycol | 91 |
| Glycerine | 88 |
| Ethanol | 78 |
| Water | 61 |
| Triacetin | 80. |

EXAMPLE II

Blotters weighing 0.61 grams were dosed with 0.10 grams of test solutions. The test solution were placed on the center of the blotters. Blotters spotted in this manner were irradiated with 2450 MHz microwave (750 watts) radiation for various periods of time, starting at 20 seconds. The results of testing variables are summarized in Table II.

TABLE II

| EXAMPLE | Amino Acid | Amino Acid Wt. | Sugar | Sugar Wt. | Solvent | Solvent Wt. | Initial pH | pH ADJ Agent | pH ADJ Agent Wt. | Microwave Time | Color Appearance | Aroma |
|---|---|---|---|---|---|---|---|---|---|---|---|---|
| II-1 | Proline | 3.7 g | Rhamnose | 5.3 g | Ethanol | 16 g | 7–8 | NaHCO$_3$ | 2.7 g | 80 sec. | White | None |
| II-2 | Proline | 3.7 g | Rhamnose | 5.3 g | Ethanol Glycerine | 16 g 25 g | 7–8 | NaHCO$_3$ | 2.7 g | 40 sec. 20 sec. | Burnt Brown Golden Brown | Burnt Crusty Bready Sweet |
| II-3 | Proline | 3.7 g | Rhamnose | 5.3 g | Ethanol | 16 g | 6–7 | NaHCO$_3$ HOAc | 2.7 g 2.2 g | 40 sec. 80 sec. 120 sec. | White White White | None None None |
| II-4 | Proline | 3.7 g | Rhamnose | 5.3 g | Ethanol Glycerine | 16 g 25 g | 6–7 | NaHCO$_3$ HOAc | 2.7 g 2.2 g | 20 sec. | Golden Brown | Bready Sweet |
| II-5 | Proline | 3.7 g | Rhamnose | 5.3 g | Ethanol Glycerine | 16 g 50 g | 7–8 | NaHCO$_3$ | 2.7 g | 20 sec. | Golden Brown | Bready Sweet |
| II-6 | Proline | 3.7 g | Rhamnose | 5.3 g | Ethanol Glycerine | 16 g 75 g | 7–8 | NaHCO$_3$ | 2.7 g | 20 sec. | Dark Brown | Bready |
| II-7 | Proline | 3.7 g | Rhamnose | 5.3 g | Ethanol Glycerine | 16 g 175 g | 7–8 | NaHCO$_3$ | 2.7 g | 20 sec. | Golden Brown | Bready |
| II-8 | Proline | 3.5 g | Ribose | 4.5 g | Ethanol | 16 g | 7–8 | NaHCO$_3$ | 2.7 g | 80 sec. | White | None |
| II-9 | Proline | 3.5 g | Ribose | 4.5 g | Ethanol Glycerine | 16 g 25 g | 7–8 | NaHCO$_3$ | 2.7 g | 20 sec. | Dry Dark Brown | Burnt Bready |
| II-10 | Proline | 3.5 g | Ribose | 4.5 g | Ethanol Glycerine | 16 g 50 g | 7–8 | NaHOC$_3$ | 2.7 g | 20 sesc. | Dark Brn. Golden | Sweet Bready |
| II-11 | Proline | 3.5 g | Ribose | 4.5 g | Ethanol Glycerine | 16 g 50 g | 6–7 | NaHCO$_3$ HOAc | 2.7 g 5.0 g | 20 sec. | Golden Brown | Sweet Bready |
| II-12 | Proline | 12.5 g | Ribose Fructose | 3.7 g 33.9 g | Water | 50 g | 7–8 | Sodium Bicarbonate | 20.0 g | 360 sec. | Golden Brown | Sweet, Bready, Vanillin-like |

What is claimed is:

1. A process for providing a cooked baked goods foodstuff comprising the steps of:
    (a) providing an uncooked baked goods composition having a continuous surface;
    (b) providing a mixture of:
        (i) 10–20% proline;
        (ii) 2–5% ribose;
        (iii) 30–60% fructose; and
        (iv) 40–60% of a solvent selected from the group consisting of:
            water;
            propylene glycol;
            glycerine;
            a mixture of water and glycerine;
            a mixture of propylene glycol and water; and
            a mixture of propylene glycol and glycerine;
    (c) coating the mixture of (b) onto the surface of an uncooked foodstuff provided in (a); and
    (d) exposing the thus coated uncooked foodstuff to microwave radiation for a period of time between 40 seconds and 360 seconds,
with the pH of the coating being in the range of from about up to about 13.

2. The product produced according to the process of claim 1.

3. The process of claim 1 wherein the solvent is water.

4. the product produced according to the process of claim 3.

* * * * *